(12) United States Patent
Yang et al.

(10) Patent No.: US 11,682,874 B2
(45) Date of Patent: Jun. 20, 2023

(54) ROTATING DEVICE AND ROTATING RADAR DEVICE

(71) Applicant: SHENZHEN 3IROBOTIX CO., LTD., Guangdong (CN)

(72) Inventors: Yong Yang, Shenzhen (CN); Haitao Gong, Shenzhen (CN); Ting Gao, Shenzhen (CN)

(73) Assignee: SHENZHEN 3IROBOTIX CO., LTD., Guangdong (CN)

( * ) Notice: Subject to any disclaimer, the term of this patent is extended or adjusted under 35 U.S.C. 154(b) by 477 days.

(21) Appl. No.: 16/979,663

(22) PCT Filed: May 8, 2018

(86) PCT No.: PCT/CN2018/086001
§ 371 (c)(1),
(2) Date: Sep. 10, 2020

(87) PCT Pub. No.: WO2019/174114
PCT Pub. Date: Sep. 19, 2019

(65) Prior Publication Data
US 2021/0028587 A1    Jan. 28, 2021

(30) Foreign Application Priority Data

Mar. 12, 2018 (CN) .......................... 201810203416.1

(51) Int. Cl.
*H01Q 3/04* (2006.01)
*H02K 5/173* (2006.01)
(Continued)

(52) U.S. Cl.
CPC ........... *H01R 39/64* (2013.01); *F16C 41/002* (2013.01); *G01S 7/02* (2013.01); *H01Q 3/04* (2013.01);
(Continued)

(58) Field of Classification Search
CPC .. H01Q 3/02; H01Q 3/04; H01Q 3/06; H01Q 3/08; F16C 41/002; H04B 5/0031;
(Continued)

(56) References Cited

U.S. PATENT DOCUMENTS 5,066,207 A    11/1991  Valavaara
5,780,947 A *  7/1998  Fukuoka ................. H02K 7/061
                                                      310/90
(Continued)

FOREIGN PATENT DOCUMENTS

CN           51-42907 A     4/1976
CN          101872198 A    10/2010
(Continued)

OTHER PUBLICATIONS

Chinese Office Action dated Jul. 1, 2019 issued in corresponding Patent Application No. 201810203416.1 (3 pages).
(Continued)

*Primary Examiner* — Tho G Phan
(74) *Attorney, Agent, or Firm* — Polsinelli PC

(57) ABSTRACT

A rotating device and a rotating radar device. The rotating device comprises a fixed platform and a rotating platform; the top of the fixed platform and the bottom of the rotating platform are rotatably connected by a rotating shaft, a first bearing, and a second bearing; the rotating shaft is connected to the inner ring; the fixed platform includes a carbon brush and a first magnetic member; the rotating platform includes a second magnetic member and a rotor conductive ring; an outer ring of the first bearing is connected to the fixed platform; an inner ring of the second bearing is connected to the fixed platform, and an outer ring of the second bearing is connected to the rotating platform.

15 Claims, 4 Drawing Sheets

(51) Int. Cl.
*H01R 39/64* (2006.01)
*F16C 41/00* (2006.01)
*G01S 7/02* (2006.01)

(52) U.S. Cl.
CPC ...... *F16C 2380/00* (2013.01); *H01R 2201/20* (2013.01)

(58) Field of Classification Search
CPC .... H04B 5/0037; H04B 5/0081; G08C 17/04; H02K 13/003; H02K 7/1807; F16M 11/06; F16M 11/08; F16M 11/18; H01R 39/64
See application file for complete search history.

(56) References Cited

U.S. PATENT DOCUMENTS

| | | | | |
|---|---|---|---|---|
| 6,323,570 | B1 * | 11/2001 | Nishimura | A47L 9/2857 310/90 |
| 6,489,702 | B1 * | 12/2002 | Bartman | H02K 13/003 439/19 |
| 6,517,357 | B1 * | 2/2003 | Athanasiou | H01R 39/64 439/26 |
| 6,930,419 | B1 * | 8/2005 | Park | H02K 5/1675 310/89 |
| 8,975,796 | B2 * | 3/2015 | Kado | H02K 5/1732 310/90 |
| 9,885,942 | B2 * | 2/2018 | Zhao | F16M 11/10 |
| 2022/0393542 | A1 * | 12/2022 | Lu | H02K 11/40 |

FOREIGN PATENT DOCUMENTS

| | | |
|---|---|---|
| CN | 106712600 A | 5/2017 |
| CN | 106788611 A | 5/2017 |
| CN | 208094547 U | 11/2018 |
| ES | 2426015 A2 | 10/2013 |

OTHER PUBLICATIONS

International Search Report dated Sep. 27, 2018 in the parent application PCT/CN2018/086001 (6 pages).
European Search Report dated Nov. 10, 2021 issued in corresponding Patent Application No. 18910151.2 (7 pages).

* cited by examiner

ROTATING DEVICE AND ROTATING RADAR DEVICE

CROSS-REFERENCE OF THE RELATED APPLICATIONS

This application is a National Phase of International Application No. PCT/CN2018/086001, filed May 8, 2018, which claims the benefit of Chinese Patent Application No. 201810203416.1 entitled "ROTATING DEVICE AND ROTATING RADAR DEVICE", filed on Mar. 12, 2018, the entire contents of which are incorporated by reference herein in their entireties.

TECHNICAL FIELD

The present disclosure relates to the technical field of electronic communication rotating platforms, and in particular to a rotating device and a rotating radar device.

BACKGROUND

Smart devices, such as drones, unmanned vehicles, and smart robots, often need to monitor the surrounding environment via sensors to obtain relevant environmental parameters, such that the control device can calculate and process the environmental parameters to obtain device operating parameters and control the operation of the smart device. Sensing equipment is mostly equipped with a rotatable platform, and the existing rotating platform often has unstable rotation, which affects the signal transmission quality and power supply stability of the sensor.

SUMMARY

One object of the present disclosure is to provide a rotating device with stable rotation to improve the aforementioned problems.

The technical solution adopted by the present disclosure to solve the technical problem is:

The present disclosure provides a rotating device, which includes a fixing platform and a rotating platform:

a top end of the fixing platform and a bottom end of the rotating platform are rotatably connected via a rotating shaft, a first bearing, and a second bearing, the rotating shaft is connected to and extends through an inner ring of the first bearing, and the fixing platform includes a carbon brush arranged around the rotating shaft and a first magnetic member arranged around the second bearing;

the rotating platform includes a second magnetic member matched with the first magnetic member and a rotor conductive ring matched with and connected to the carbon brush, the rotor conductive ring is arranged around the first bearing;

an outer ring of the first bearing is connected to the fixing platform, an inner ring of the second bearing is connected to the fixing platform, an outer ring of the second bearing is connected to the rotating platform, such that the rotating platform is capable of stably rotating around the rotating shaft with respect to the fixing platform, and table power supply and continuous transmission of communication signal of the rotating platform and the fixing platform are achieved via the carbon brushes and the rotor conductive ring that are matched and connected.

In an optional embodiment of the present disclosure, the first bearing, the second bearing, and the rotating platform are concentrically arranged.

In an optional embodiment of the present disclosure, the first bearing is provided adjacent to a bottom end of the fixing platform, and the second bearing is provided adjacent to the top end of the fixing platform, and a radius of the second bearing is greater than a radius of the first bearing.

In an optional embodiment of the present disclosure, the carbon brush includes a spring sleeve and a brush body elastically fixed on the spring sleeve, the spring sleeve is connected to the fixing platform, and a spring of the spring sleeve tightly presses the brush body, such that the brush body is in elastic contact with the rotor conductive ring.

In an optional embodiment of the present disclosure, an outer surface of the rotor conductive ring is provided with a copper foil, and the brush body is in elastic contact with the copper foil.

In an optional embodiment of the present disclosure, a number of rotor conductive rings is multiple, a number of carbon brushes is also multiple, and the plurality of brush bodies and the plurality of the rotor conductive rings are arranged in one-to-one correspondence.

In an optional embodiment of the present disclosure, the rotor conductive ring has a cylinder shape, and the plurality of rotor conductive rings are stacked axially and are capable of rotating coaxially with the rotating platform.

In an optional embodiment of the present disclosure, an insulating gasket is provided between two adjacent rotor conductive rings.

In an optional embodiment of the present disclosure, the rotating platform further includes a rotor conductive ring framework, one side of the conductive ring framework is connected to the rotating platform, and the rotor conductive ring and the second magnetic member are mounted on the other side thereof.

In an optional embodiment of the present disclosure, the rotor conductive ring framework includes a connecting disk, a first fixing ring and a second fixing ring;

the second fixing ring is arranged around the periphery of the first fixing ring; the first fixing ring is configured to mount the rotor conductive ring, and is configured to be rotatably connected to the rotating shaft via the first bearing; the second fixing ring is configured to mount the second magnetic member and is configured to be rotatably connected to the fixing platform via the second bearing;

the first fixing ring and the second fixing ring are protruded on one side of the connecting disk respectively, and the other side of the connecting disk is configured to be connected to the rotating platform.

In an optional embodiment of the present disclosure, the rotating platform further includes a control main board connected to the rotor conductive ring.

In an optional embodiment of the present disclosure, a coil is wound on the first magnetic member.

In an optional embodiment of the present disclosure, the fixing platform further includes a second control main board connected to the coil.

In an optional embodiment of the present disclosure, the first magnetic member and the second magnetic member both have a ring shape, and the first magnetic member gap ring is arranged around the periphery of the second magnetic member.

Another object of the present disclosure is to provide a rotating radar device, and a radar module thereof can be operated stably.

The technical solution adopted by the present disclosure to solve the technical problem is:

The rotating radar device includes a fixing platform, a rotating platform and a radar module:

the top end of the fixing platform and the bottom end of the rotating platform are rotatably connected via a rotating shaft, a first bearing, and a second bearing, the rotating shaft is connected to and extends through an inner ring of the first bearing, and the fixing platform includes a carbon brush arranged around the rotating shaft and a first magnetic member arranged around the second bearing;

the rotating platform includes a second magnetic member matched with the first magnetic member and a rotor conductive ring matched with and connected to the carbon brush, the rotor conductive ring is arranged around the first bearing, the rotating platform is further provided with a control main board, and the radar module is connected to the rotor conductive ring via the control main board;

an outer ring of the first bearing is connected to the fixing platform, an inner ring of the second bearing is connected to the fixing platform, an outer ring of the second bearing is connected to the rotating platform to enhance stability of the platform when it rotates around the rotating shaft with respect to the fixing platform, and stable power supply and continuous transmission of communication signals of the rotating platform and the fixing platform are achieved via the carbon brush and the rotor conductive ring that are matched and connected, so as to maintain a stable operation of the radar module.

The beneficial effects of the embodiments of the present disclosure are:

The embodiments of the present disclosure provide a rotating device and a rotating radar device. The rotating device includes a fixing platform and a rotating platform. A top end of the fixing platform and a bottom end of the rotating platform are rotatably connected via a rotating shaft, a first bearing, and a second bearing. The rotating shaft is connected to and extends through an inner ring of the first bearing. The rotating platform and the fixing platform enhance stability of the rotating platform when rotating via the first bearing and the second bearing arranged in the upper position and lower position. At the same time, the rotating platform and the fixing platform maintain stable transmission of electric energy and communication information via the one-to-one correspondence of the number and mounting positions of the carbon brushes and the rotor conductive rings, which ensures the working stability of the rotating device. Further, the embodiments of the present disclosure also provide a rotating radar platform. A radar module is mounted on the rotating platform of the rotating radar platform. The rotating radar platform provides stable power supply and communication signal transmission to the radar module via the matching rotor conductive rings and carbon brushes.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

The above and other objects and features of the present invention will become apparent and more readily appreciated from the following description of the embodiments with reference to the following figures, wherein like reference numerals refer to like parts throughout the various figures unless otherwise specified.

Figure 1:
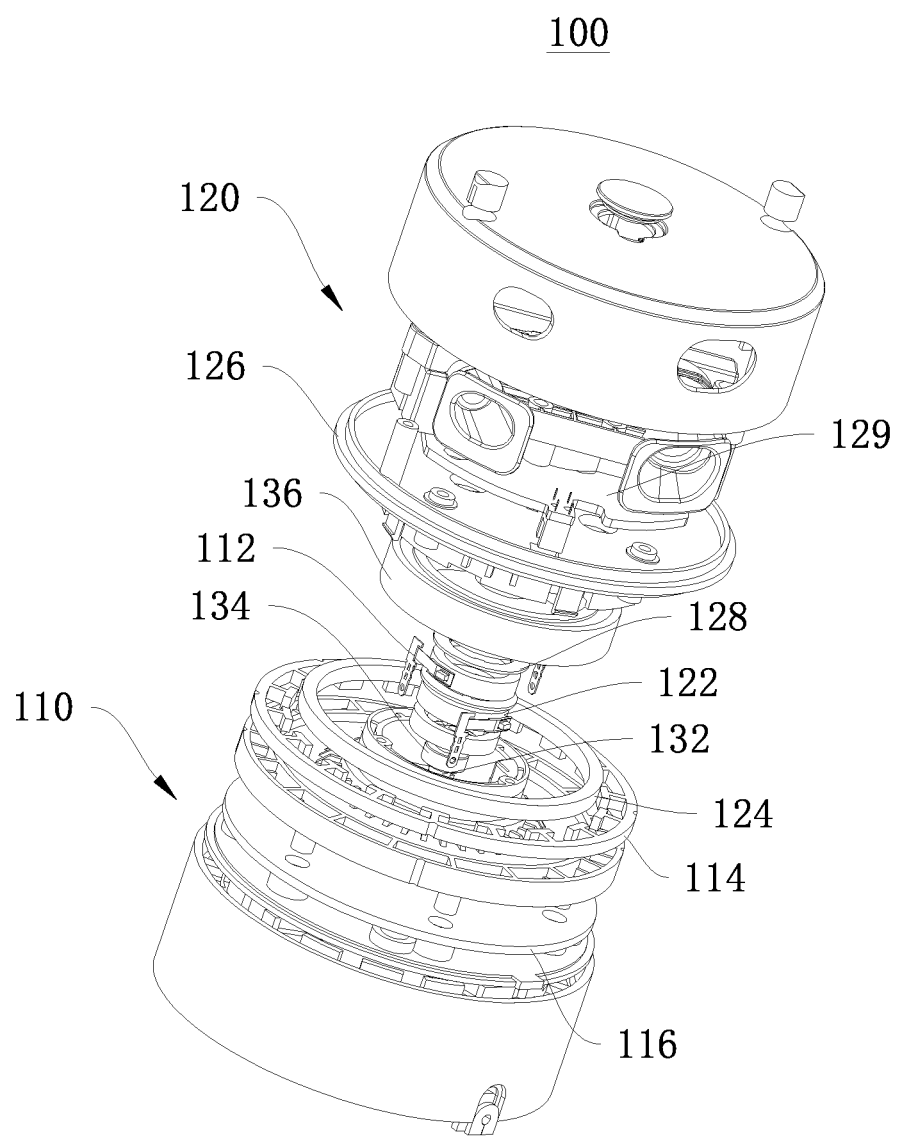
FIG. 1 is a exploded schematic view of a rotating device according to a first embodiment of the present disclosure.

Label: 100—rotating device; 110—fixing platform; 112—carbon brush; 1121—spring sleeve; 1123—brush body; 114—first magnetic member; 116—second control main board; 120—rotating platform; 122—rotor conductive ring; 124—second magnetic member; 126—rotor conductive ring framework; 1261—connecting disk; 1262—first fixing ring; 101—first inner peripheral surface; 102—first outer peripheral surface; 1263—second fixing ring 103—second inner peripheral surface; 104—second outer peripheral surface; 128—insulating gasket; 129—control main board; 130—connecting component; 132—rotating shaft; 134—first bearing; 136—second bearing; 200—rotating radar device; 210—radar module.

DETAILED DESCRIPTION OF THE EMBODIMENTS

In order to make the purpose, technical solutions and advantages of the embodiments of the present disclosure clearer, the technical solutions in the embodiments of the present disclosure will be described clearly and completely with reference to the accompanying drawings in the embodiments of the present disclosure. Obviously, the described embodiment is a part of the embodiments of the present disclosure, but not all the embodiments. The components of the embodiments of the present disclosure generally described and illustrated in the drawings herein may be arranged and designed in various different configurations.

Therefore, the following detailed description of the embodiments of the present disclosure provided in the accompanying drawings is not intended to limit the scope of the claimed present disclosure, but merely represents selected embodiments of the present disclosure. All other embodiments obtained by a person who skill in the art based on the embodiments in the present disclosure without creative efforts are within the scope of the present disclosure.

It should be noted that similar reference numerals and letters indicate similar items in the following figures. Therefore, once an item is defined in one figure, it does not need to be further defined and explained in subsequent figures.

In the description of the present disclosure, it should be noted that the orientation or positional relationship indicated by the terms "inner" and "outer" is based on the orientation or positional relationship shown in the drawings, or is habitually placed when the disclosed product is used. The orientation or positional relationship is only for the convenience of describing the present disclosure and simplifying the description, rather than indicating or implying that the device or element referred to must have a specific orientation, be constructed and operated in a specific orientation, and therefore cannot be understood as a limitation of the present disclosure. In addition, the terms "first", "second", etc. are only used for distinguishing description, and cannot be understood as indicating or implying relative importance.

In addition, the terms "horizontal", "vertical" and other terms do not mean that the component is required to be absolutely horizontal or overhang, but may be slightly inclined. For example, "horizontal" only means that its direction is more horizontal than "vertical", it does not mean that the structure must be completely horizontal, but can be slightly inclined.

In the description of the present disclosure, it should also be noted that, unless otherwise clearly specified and limited, the terms "set", "connect with", and "connect to" should be understood in a broad sense, for example, they may be a fixed connection, a detachable connection or an integral connection; it can be a mechanical connection or an electrical connection; it can be directly connected, or indirectly connected through an intermediate medium, and it can be the internal communication between two components. For those who skill in the art, the specific meaning of the aforementioned terms in the present disclosure can be understood in specific situations.

Other features and advantages of the present disclosure will be described in the following description, and partly become obvious from the description, or understood by implementing the embodiments of the present disclosure. The objectives and other advantages of the present disclosure can be realized and obtained through the structures specifically pointed out in the written description, claims, and drawings.

First Embodiment

According to the research of the applicant, it is found that the existing rotating platforms such as PTZ of UAV and activity radar platforms of vehicles often use slip rings to transmit energy and information when collecting and transmitting information, and when transmitting data and power supply. When slip rings are used for power supply and communication information transmission, the requirement of stability of the rotating platform is extremely high. The rotating platform may start and stop frequently during rotation. If the stability of the rotating platform is poor, there will be problems of poor quality of information collection, unstable power supply and communication.

Figure 2:
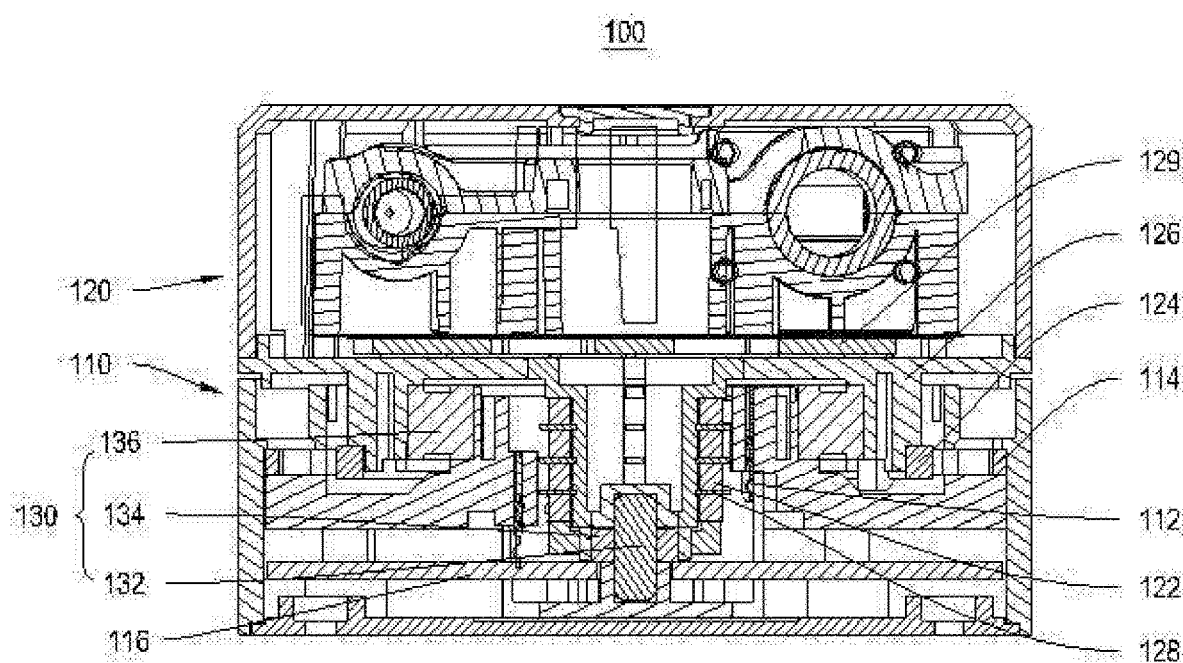
FIG. 2 is a cross-sectional view of the rotating device according to the first embodiment of the present disclosure.

FIG. 1 is an exploded schematic view of a rotating device according to the first embodiment of the present disclosure. FIG. 2 is a cross-sectional view of the rotating device according to the first embodiment of the present disclosure. Referring to FIG. 1 and FIG. 2, In order to solve the aforementioned problem, the first embodiment of the present disclosure provides a rotating device 100, which includes a fixing platform 110, a rotating platform 120, and a connecting component 130.

The connecting component 130 includes a rotating shaft 132 and a first bearing 134. A top end of the fixing platform 110 and a bottom end of the rotating platform 120 are rotatably connected via the rotating shaft 132. Further, the rotating shaft 132 is connected and extends through an inner ring of the first bearing 134, an outer ring of the first bearing 134 is connected to the fixing platform 110. Driving by external force, the rotating platform 120 can rotate around the rotating shaft 132 and the first bearing 134 with respect to the fixing platform 110.

Since the rotating platform 120 of the rotating device 100 is usually mounted with an image collecting device, a sound collecting device or other functional devices, the image collecting device and other information collecting devices require high rotation stability of the rotating device 100 when collecting information. The image collecting device can only guarantee the accuracy and reliability of the collected information when the rotating platform 120 and the rotating device 100 remain stable.

In order to ensure the stability of the rotating device 100 during operation, the connecting component 130 provided by this embodiment further includes a second bearing 136. An inner ring of the second bearing 136 is connected to the fixing platform 110, and an outer ring of the second bearing 136 is connected to the rotating platform 120.

Further, the first bearing 134 is provided adjacent to a bottom end of the fixing platform 110, and the second bearing 136 is provided adjacent to the top end of the fixing platform 110.

As an embodiment, the first bearing 134 in this embodiment is an oil-impregnated bearing, and the second bearing 136 is a ball bearing.

The oil-impregnated bearing is a porous bearing, which uses metal powder as the main raw material. The oil-impregnated bearing is a sintered body made by powder metallurgy, which is inherently porous and has a relatively free adjustment of number, size, shape, distribution and other technical advantages of pores during the manufacturing process. The oil-impregnated bearing has a higher rated load and a higher limit speed; the ball bearing is a kind of rolling bearing. The spherical alloy steel ball is mounted in the middle of the inner steel ring and the outer steel ring to reduce friction in the process of power transmission and improve the efficiency of mechanical power transmission via a rolling method. Ball bearing cannot withstand large and heavy loads and is more common in light industrial machinery, which has lower rated loads and higher limit speeds.

At the same time, a radius of the second bearing 136 is greater than that of the first bearing 134, so as to increase a contact area of the inner ring and the outer ring of the second bearing 136 with the fixing platform 110 and the rotating platform 120, thereby enhancing the operation stability of the rotating device 100.

It should be understood that, besides the oil-impregnated bearing and ball bearing used in this embodiment, the first bearing 134 and the second bearing 136 may also be selected from other types of bearings that can enable the rotating device 100 to operate smoothly, such as combined bearings, spherical bearings, etc.

As an embodiment, the first bearing 134, the second bearing 136, and the rotating platform 120 are concentrically arranged in this embodiment.

Figure 3:
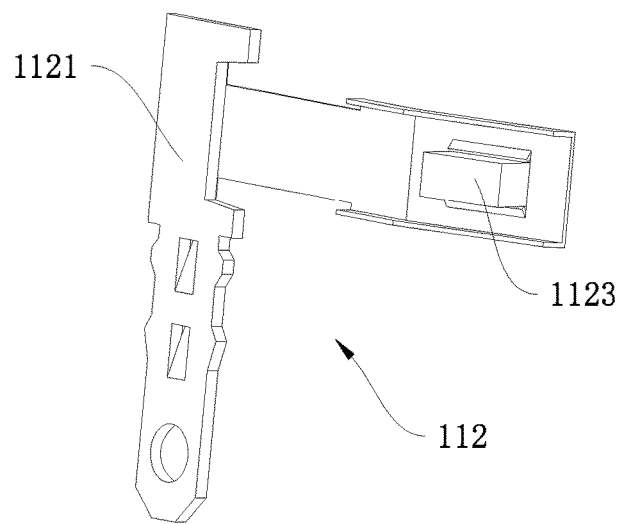
FIG. 3 is a schematic view of a carbon brush according to the first embodiment of the present disclosure.

Referring to FIG. 1, in order to realize power supply and communication transmission, the fixing platform 110 includes a carbon brush 112 arranged around the rotating shaft 132 and a first magnetic member 114. A distance between the first magnetic member 114 and the rotating shaft 132 is longer than a distance between the carbon brush 112 and the rotating shaft 132. FIG. 3 is a schematic view of a carbon brush provided by embodiment 1 of the present disclosure. Referring to FIG. 3, as an embodiment the carbon brush 112 includes a spring sleeve 1121 and a brush body 1123 elastically fixed on the spring sleeve 1121.

The carbon brush 112 is also called electric brush. As a sliding contact element, it is widely used in many electrical equipment. A product application material of the carbon brushes mainly includes graphite, grease-impregnated graphite, and metal (including copper and silver) graphite. The carbon brush is a device that transmits energy or signals between the fixing part and the rotating part of a motor, a generator or other rotating machinery. The carbon brush is generally made of pure carbon and a coagulant. The carbon brush is shaped generally a block and is stuck on a metal bracket (i.e. the spring sleeve 1121). A spring from inside tightly presses the carbon brush against the rotating shaft. When the motor rotates, the electric energy or signal is transmitted to the coil via the inverter.

One end of the spring sleeve 1121 is connected to the fixing platform 110, and the other end thereof is set as a spring and connected to the brush body 1123 to cooperate with the rotating platform 120.

As an embodiment, a number of carbon brushes 112 is multiple in this embodiment, and the plurality of carbon brushes 112 are mounted in the fixing platform 110 at intervals.

As an embodiment, the first magnetic member 114 in this embodiment is a silicon steel sheet, and the first magnetic member 114 has a ring shape.

Silicon steel sheet is a kind of ferrosilicon soft magnetic alloy with very low carbon content and generally has a silicon content of 0.5-4.5%. Silicon steel sheet is produced by hot rolling and cold rolling. The addition of silicon can increase the resistivity and maximum magnetic permeability of iron and reduce the coercivity, core loss (iron loss) and magnetic aging. Silicon steel sheet is mainly used to produce iron cores of various transformers, motors and generators.

A coil is wound on the first magnetic member 114, i.e. the silicon steel sheet. The rotation speed and direction of the rotating platform 120 can be controlled by controlling the magnitude and direction of the current in the coil.

In order to control the magnitude and direction of the current in the coil, as an embodiment, a second control main board 116 is further provided on the fixing platform 110 in this embodiment, and the coil is electrically connected to the second control main board 116.

Referring to FIGS. 1 and 2, the rotating platform 120 includes a rotor conductive ring 122 matched with the carbon brush 112 and a second magnetic member 124 matched with the first magnetic member 114.

The rotor conductive ring 122 belongs to the application category of electrical contact sliding connection, which is a precision power transmission device that realizes the image, data signal and power transmission of the two mechanisms rotating relatively, which is suitable for places where continuous rotation is unlimited and power or data transmitted from a fixing position to a rotating position is needed.

Figure 4:
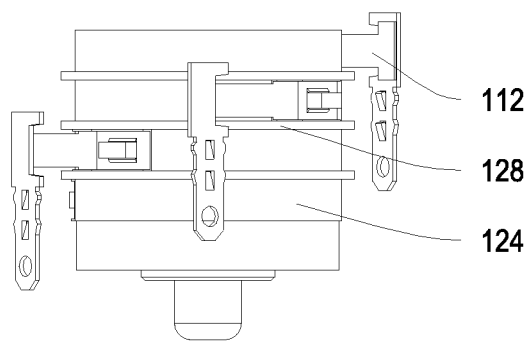
FIG. 4 is a schematic view of the connection between a carbon brush and a rotor conductive ring according to the first embodiment of the present disclosure.
Figure 5:
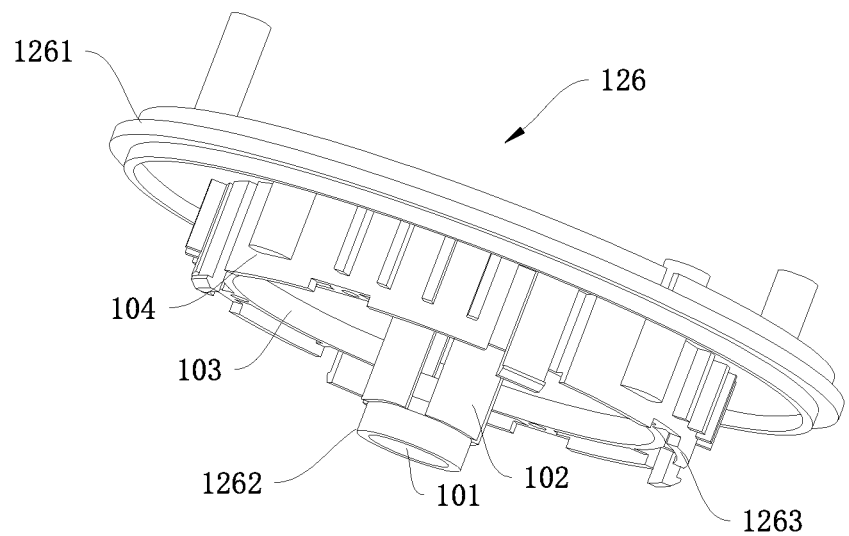
FIG. 5 is a schematic view of a rotor conductive ring framework according to the first embodiment of the present disclosure.

FIG. 4 is a schematic view of the connection between the carbon brush and the rotor conductive ring according to the first embodiment of the present disclosure. Referring to FIGS. 3 and 4, an outer surface of the rotor conductive ring 122 is provided with a copper foil, and the spring in the spring sleeve 1121 presses the brush body 1123 tightly, such that the brush body 1123 is in elastic contact with the copper foil.

In this embodiment, the part of the brush body 1123 in contact with the copper foil is made of carbon crystal.

Optionally, the rotor conductive ring 122 in this embodiment is a cylindrical rotor conductive ring.

It should be understood that, in other embodiments, the rotor conductive ring 122 may also be a disk or other types of rotor conductive ring depending on specific conditions.

It should be understood that, in order to simultaneously transmit electric energy and communication information between the fixing platform 110 and the rotating platform 120, a number of rotor conductive rings 122 may be multiple. When the number of rotor conductive rings 122 is multiple, the plurality of rotor conductive rings 122 are combined and stacked axially, and are capable of rotating coaxially with the rotation of the rotating platform 120.

Further, when the number of rotor conductive rings 122 is greater than one, in order to ensure that each rotor conductive ring 122 and the corresponding carbon brush 112 thereof can transmit energy and information stably and without interference, an insulating gasket 128 is provided between every two rotor conductive rings 122.

As an embodiment, the insulating gasket 128 in this embodiment is made of a rubber-like insulating material, such as non-polar rubber with excellent insulating properties like NR, SBR, and IIR. At the same time, the insulating gasket 128 with a soft material can also buffer, support and protect the rotor conductive ring 122.

It should be understood that the number of the carbon brushes 112 is the same number as that of the rotor conductive rings 122, and they are in one to one correspondence. It can be understood that in other preferred embodiments, the number of carbon brushes 112 and the number of rotor conductive rings 122 can also be set to one accordingly.

The second magnetic member 124 is a permanent magnet matched with the silicon steel sheet. The second magnetic member 124 also has a ring shape, and the first magnetic member 114 is arranged around the periphery of the second magnetic member 124 at intervals.

The second magnetic member 124, i.e. the permanent magnet, functions to generate a magnetic field. Permanent magnet refers to a magnet that can retain high remanence for a long time in an open circuit state after magnetization to generate a magnetic field. As an embodiment, the permanent magnet in this embodiment may be ferrite, and in other embodiments may also be an Al—Ni—Co-based permanent magnet alloy or a Fe—Cr—Co-based permanent magnet alloy.

It should be understood that the permanent magnets in this embodiment are multiple pairs of magnetic poles, and in other embodiments, the permanent magnet may also be a single pair of magnetic poles.

Referring to FIGS. 1 and 2, in order to facilitate the mounting and fixation of the rotor conductive ring 122 and the second magnetic member 124, as an embodiment, in this embodiment, the rotating platform 120 further includes a rotor conductive ring framework 126.

The rotor conductive ring framework 126 includes a connecting disk 1261, a first fixing ring 1262, and a second fixing ring 1263. The first fixing ring 1262 and the second fixing ring 1263 are both protruded on the same side of the connecting disk 1261, and the other side of the connecting disk 1261 is configured to be connected to the rotating platform 120.

The second fixing ring 1263 is arranged around the periphery of the first fixing ring 1262.

A first inner peripheral surface 101 of the first fixing ring 1262 is configured to be connected to the rotating shaft 132 via the first bearing 134. The rotating shaft 132 is rotatably connected to the fixing platform 110. A first outer peripheral surface 102 of the first fixing ring 1262 is configured to mount the rotor conductive ring 122.

A second inner peripheral surface 103 of the second fixing ring 1263 is configured to rotatably connect to the fixing platform 110 via the second bearing 136, and a second outer peripheral surface 104 of the second fixing ring 1263 is configured to mount the second magnetic member 124.

It should be understood that the rotor conductive ring 122 and the second magnetic member 124 are fixed on the rotating platform 120 via the rotor conductive ring framework 126 respectively, such that the changing magnetic field generated by the coil and the first magnetic member 114 can drive the second magnetic member 124 to rotate when the coil is energized, and the rotating platform 120 and the rotor conductive ring 122 can further be driven to rotate with respect to the fixing platform 110 via the rotor conductive ring framework 126.

In order to prevent other elements in the rotating device 100 from affecting the power supply function and communication function of the rotor conductive ring 122, the rotor conductive ring framework 126 may be made of insulating materials, such as plastic, rubber and the like.

Specifically, the rotor conductive ring framework 126 in this embodiment is made of fluorine-containing plastic material. The fluorine plastic has excellent heat resistance, cold resistance, insulation properties and high-frequency electrical properties, and at the same time has non-dryness, self-lubrication, and low friction coefficient etc.

Referring to FIG. 1, in order to further realize information feedback, the rotating platform 120 further includes a control main board 129, which is provided between the rotor conductive ring framework 126 and the rotating platform 120 and is connected to the rotor conductive ring 122.

Figure 6:
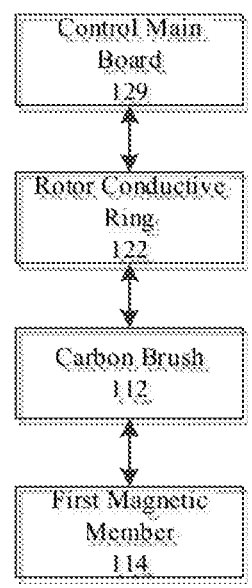
FIG. 6 is a communication flowchart of a rotating platform according to the first embodiment of the present disclosure.

FIG. 6 is a communication flowchart of a rotating platform according to the first embodiment of the present disclosure. Referring to FIG. 6, the control main board 129 can complete power supply and information transmission via the rotor conductive ring 122, and process the information, that is: the control main board 129 transmits control information to the rotor conductive ring 122, obtains the feedback information transmitted from the fixing platform 110 via the rotor conductive ring 122, and accurately controls the rotating platform 110 based on the control information and the feedback information. The control information and the feedback information are both transmitted by current.

The control main board 129 is further connected to the first magnetic member 114 via the rotor conductive ring 122 and the carbon brush 112, such that the control main board 129 controls the current state of the first magnetic member 114 to complete the rotation control of the rotating platform 110.

The working principle of the rotating device 100 provided in this embodiment is:

For a rotating device 100 provided in this embodiment, supplying power to the coil can drive the second magnetic member 124 to rotate with respect to the fixing platform 110, and the rotating platform 120 is driven to rotate with respect to the fixing platform 110. With the cooperation and support of the first bearing 134 and the second bearing 136, the rotating platform 120 is more stable during rotating. In addition, stable communication information transmission of the control main board 129 can be achieved via the carbon brush 112 and the rotor conductive ring 122 elastically connected to the carbon brush 112, thereby further controlling the magnitude and direction of the current in the coil via the rotor conductive ring 122 and the carbon brush 112, and adjusting the rotation speed and rotation angle of the rotating platform 120. The rotating device 100 can also be connected to an external control system, an alarm system, etc., via the second control main board 116, and input or output electrical energy and communication information.

Second Embodiment

Figure 7:
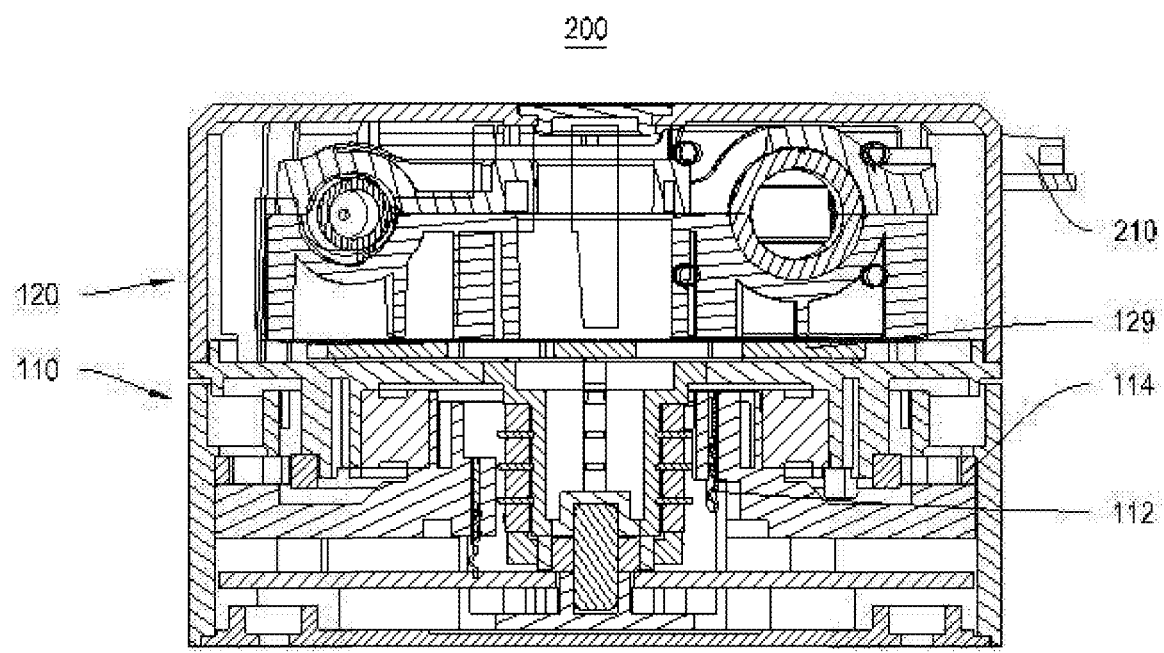
FIG. 7 is a schematic view of a rotating radar device according to the second embodiment of the present disclosure.

Referring to FIG. 7, which is a schematic diagram of a rotating radar device according to a second embodiment of the present disclosure.

The difference between the rotating radar device 200 and the rotating device 100 is that, the rotating radar device 200 further includes a radar module 210 connected to the control main board 129. At the same time, a radar fixing area for fixing the radar module 210 is also provided outside the rotating platform 120.

The other structure of the rotating device 100 not mentioned in this embodiment is the same as the structure of the rotating device 100 disclosed in the first embodiment, and will not be repeated here.

The radar module 210 is mounted in a radar fixing area. The radar module 210 collects environmental information from multiple angles during the rotation of the rotating platform 120 and transmits it to the control main board 129 to complete the transmission of environmental information. At the same time, the control information related to the radar module 210 and the rotating platform 120 is also generated by the control main board 129, the control information including the rotation control information for controlling the current of the silicon steel sheet to control the rotation of the rotating platform 120. The rotation control information is transmitted to the first magnetic member 114 via the carbon brush 112 and the rotor conductive ring 114.

In summary, the present disclosure provides a rotating device and a rotating radar device. The rotating device includes a fixing platform and a rotating platform. A top end of the fixing platform and a bottom end of the rotating platform are rotatably connected via a rotating shaft, a first bearing, and a second bearing. The rotating shaft is connected to and extends through an inner ring of the first bearing. The rotating platform and the fixing platform improve the stability of the rotating platform during rotating via the first bearing and the second bearing arranged in the upper position and lower position. At the same time, the rotating platform and the fixing platform maintain stable transmission of electric energy and communication information via the one-to-one correspondence of the number and mounting positions of the carbon brushes and the rotor conductive ring, which ensures the working stability of the rotating device. Further, the embodiments of the present disclosure also provide a rotating radar platform. A radar module is mounted on the rotating platform of the rotating radar platform. The rotating radar platform provides stable power supply and communication signal transmission to the radar module via the matching rotor conductive rings and carbon brushes.

The above are only the preferred embodiments of the present disclosure and are not used to limit the present disclosure. For those skilled in the art, the present disclosure may have various modifications and changes. Any modification, equivalent replacement, improvement, etc. made within the spirit and principle of the present disclosure shall be included in the protection scope of the present disclosure.

INDUSTRIAL APPLICABILITY

In the rotating device provided by the present disclosure, the rotating platform and the fixing platform thereof are rotatably connected via a rotating shaft, and a first bearing and a second bearing are arranged between the rotating platform and the fixing platform, which can improve the rotation balance of the rotating device. At the same time, stable transmission of electric energy and communication information of the rotating platform and the fixing platform are achieved via the one-to-one correspondence of the number and mounting positions of the carbon brushes and the rotor conductive ring, and ensures stability of the rotating device.

What is claimed is:

1. A rotating device, comprising a fixing platform and a rotating platform, wherein a top end of the fixing platform and a bottom end of the rotating platform are rotatably connected via a rotating shaft, a first bearing, and a second bearing, the rotating shaft is connected to and extends through an inner ring of the first bearing, and the fixing platform comprises a carbon brush arranged around the rotating shaft and a first magnetic member arranged around the second bearing;

the rotating platform comprises a second magnetic member matched with the first magnetic member and a rotor conductive ring matched with and connected to the carbon brush, the rotor conductive ring is arranged around the first bearing;

an outer ring of the first bearing is connected to the fixing platform, an inner ring of the second bearing is connected to the fixing platform, an outer ring of the second bearing is connected to the rotating platform, such that the rotating platform is capable of stably rotating around the rotating shaft with respect to the fixing platform, and stable power supply and continuous transmission of communication signal of the rotating platform and the fixing platform are achieved via the carbon brushes and the rotor conductive ring that are matched and connected.

2. The rotating device according to claim 1, wherein the first bearing, the second bearing, and the rotating platform are concentrically arranged.

3. The rotating device according to claim 1, wherein the first bearing is provided adjacent to a bottom end of the fixing platform, and the second bearing is provided adjacent to the top end of the fixing platform, and a radius of the second bearing is greater than a radius of the first bearing.

4. The rotating device according to claim 1, wherein the carbon brush comprises a spring sleeve and a brush body elastically fixed on the spring sleeve, and the spring sleeve is connected to the fixing platform, a spring of the spring sleeve tightly presses the brush body, such that the brush body is in elastic contact with the rotor conductive ring.

5. The rotating device according to claim 4, wherein an outer surface of the rotor conductive ring is provided with a copper foil, and the brush body is in elastic contact with the copper foil.

6. The rotating device according to claim 1, wherein a number of rotor conductive rings is multiple, a number of carbon brushes is also multiple, and the plurality of brush bodies and the plurality of the rotor conductive rings are arranged in one-to-one correspondence.

7. The rotating device according to claim 6, wherein the rotor conductive ring has a cylinder shape, and the plurality of rotor conductive rings are stacked axially and are capable of rotating coaxially with the rotating platform.

8. The rotating device according to claim 7, wherein an insulating gasket is provided between two adjacent rotor conductive rings.

9. The rotating device according to claim 1, wherein the rotating platform further comprises a rotor conductive ring framework, one side of the conductive ring framework is connected to the rotating platform, and the rotor conductive ring and the second magnetic member are mounted on the other side thereof.

10. The rotating device according to claim 9, wherein the rotor conductive ring framework comprises a connecting disk, a first fixing ring, and a second fixing ring; the second fixing ring is arranged around a periphery of the first fixing ring; the first fixing ring is configured to mount the rotor conductive ring, and is configured to be rotatably connected to the rotating shaft via the first bearing; the second fixing ring is configured to mount the second magnetic member and is configured to be rotatably connected to the fixing platform via the second bearing;

the first fixing ring and the second fixing ring are protruded on one side of the connecting disk respectively, and the other side of the connecting disk is configured to be connected to the rotating platform.

11. The rotating device according to claim 1, wherein the rotating platform further comprises a control main board connected to the rotor conductive ring.

12. The rotating device according to claim 1, wherein a coil is wound on the first magnetic member.

13. The rotating device according to claim 12, wherein the fixing platform further comprises a second control main board connected to the coil.

14. The rotating device according to claim 1, wherein the first magnetic member and the second magnetic member both have a ring shape, and the first magnetic member is arranged around the periphery of the second magnetic member at intervals.

15. A rotating radar device, comprising a fixing platform, a rotating platform, and a radar module, wherein a top end of the fixing platform and a bottom end of the rotating platform are rotatably connected via a rotating shaft, a first bearing, and a second bearing, the rotating shaft is connected to and extends through an inner ring of the first bearing, and the fixing platform comprises a carbon brush arranged around the rotating shaft and a first magnetic member arranged around the second bearing;

the rotating platform comprises a second magnetic member matched with the first magnetic member and a rotor conductive ring matched with and connected to the carbon brush, the rotor conductive ring is arranged around the first bearing, the rotating platform is further provided with a control main board, and the radar module is connected to the rotor conductive ring via the control main board;

an outer ring of the first bearing is connected to the fixing platform, an inner ring of the second bearing is connected to the fixing platform, an outer ring of the second bearing is connected to the rotating platform to enhance stability of the rotating platform when rotating around the rotating shaft with respect to the fixing platform, and stable power supply and continuous transmission of communication signals of the rotating platform and the fixing platform are achieved via the carbon brush and the rotor conductive ring that are matched and connected, so as to maintain a stable operation of the radar module.

* * * * *